US011616721B2

(12) United States Patent
Lorenz et al.

(10) Patent No.: US 11,616,721 B2
(45) Date of Patent: Mar. 28, 2023

(54) IN-PACKET VERSION TAGGING UTILIZING A PERIMETER NAT

(71) Applicant: INTERNATIONAL BUSINESS MACHINES CORPORATION, Armonk, NY (US)

(72) Inventors: Dean Har'el Lorenz, Haifa (IL); Katherine Barabash, Haifa (IL); Etai Lev Ran, Nofit (IL); Alexey Roytman, Givat Elah (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/102,741

(22) Filed: Nov. 24, 2020

(65) Prior Publication Data
US 2022/0166719 A1    May 26, 2022

(51) Int. Cl.
*H04L 45/7453* (2022.01)
*H04L 47/125* (2022.01)
(Continued)

(52) U.S. Cl.
CPC .......... *H04L 45/7453* (2013.01); *H04L 45/04* (2013.01); *H04L 45/566* (2013.01);
(Continued)

(58) Field of Classification Search
CPC ... H04L 45/7453; H04L 45/04; H04L 45/566; H04L 47/125; H04L 61/256; H04L 69/22;
(Continued)

(56) References Cited

U.S. PATENT DOCUMENTS 7,636,917 B2    12/2009 Darling
10,091,098 B1   10/2018 Lorenz
(Continued)

FOREIGN PATENT DOCUMENTS

WO    2017184522 A2    10/2017

OTHER PUBLICATIONS

IBM, "Customizing Ingress Routing With Annotations," IBM Cloud Docs Kubernetes Service, pp. 1-54 [online], [retrieved on Jun. 19, 2020]. Retrieved from the Internet <URL: https://cloud.ibm.com/docs/containers?topic=containers-ingress_annotation#path-routing>.
(Continued)

*Primary Examiner* — Hardikkumar D Patel
(74) *Attorney, Agent, or Firm* — David Spalding

(57) ABSTRACT

Various embodiments are directed to receiving, at a receiving device, a packet from a node in a first network. determining a version identifier for the packet, encoding the version identifier into the packet, and transmitting the packet containing the encoded version identifier to a load balancing device in a second network. The version identifier may be encoded into a destination port field of the packet. The receiving device may be a perimeter network address translation device. The packet is received at the load balancing device, where the version identifier is extracted and a hash of source address information is performed. The version and hash are used to select a back-end device in the second network. The packet is transmitted to the selected back-end device.

19 Claims, 8 Drawing Sheets

FIG. 1

(51) Int. Cl.
    *H04L 45/00*           (2022.01)
    *H04L 61/256*        (2022.01)
    *H04L 45/02*           (2022.01)
    *H04L 69/22*           (2022.01)

(52) U.S. Cl.
    CPC .......... *H04L 47/125* (2013.01); *H04L 61/256* (2013.01); *H04L 69/22* (2013.01)

(58) Field of Classification Search
    CPC ... H04L 12/4633; H04L 69/324; H04L 45/74; H04L 12/4641; H04L 2212/00; H04L 45/245; H04L 67/125; H04L 63/0209; H04L 61/2514; H04L 61/2517; H04L 67/1023; H04L 67/1027; H04L 61/2503; H04L 69/161; H04L 61/2592; H04L 45/72; H04L 45/745; H04L 63/0272; H04L 63/0428; H04L 63/164; H04L 63/0823; Y02D 30/50; G06F 9/5083
    See application file for complete search history.

(56) References Cited

U.S. PATENT DOCUMENTS

| | | | |
|---|---|---|---|
| 10,540,207 | B1 | 1/2020 | Lorenz |
| 10,541,909 | B2 | 1/2020 | Lorenz |
| 2002/0163919 | A1* | 11/2002 | Hu .................... H04L 45/745 370/469 |
| 2009/0271515 | A1 | 10/2009 | Iyengar |
| 2010/0149966 | A1 | 6/2010 | Achlioptas |
| 2012/0221676 | A1* | 8/2012 | Parker ................. H04L 67/535 709/217 |
| 2015/0009797 | A1* | 1/2015 | Koponen ............. H04L 45/02 370/216 |
| 2016/0234103 | A1* | 8/2016 | Kotalwar ............ H04L 47/2483 |
| 2016/0373294 | A1* | 12/2016 | Srivastav ............ H04L 45/245 |
| 2018/0198851 | A1 | 7/2018 | Barabash |
| 2019/0036820 | A1* | 1/2019 | Gross, IV .............. H04L 69/22 |
| 2019/0199789 | A1 | 6/2019 | Abhigyan |
| 2019/0320218 | A1* | 10/2019 | McGinn ................ H04L 1/0075 |

OTHER PUBLICATIONS

Mell, et al., "The NIST Definition of Cloud Computing", National Institute of Standards and Technology, U.S. Department of Commerce, Special Publication 800-145, Sep. 2011, pp. 1-7.

IBM, "Customizing Ingress Routing With Annotations," IBM Cloud Docs Kubernetes Service, pp. 1-54, https://cloud.ibm.com/docs/containers?topic=containers-ingress_annotation, printed Nov. 24, 2020.

Lorenz, et al., "In-Packet Version Tagging Utilizing a Perimeter NAT," Application and Drawings, Filed on Oct. 5, 2021, 43 Pages, Related US Patent Application Serial No. 10 2021 125 850.2.

Lorenz, et al., "In-Packet Version Tagging Utilizing a Perimeter NAT," Application and Drawings, Filed on Nov. 10, 2021, 45 Pages, Related US Patent Application Serial No. 2116119.5.

Lorenz, et al., "In-Packet Version Tagging Utilizing a Perimeter NAT," Application and Drawings, Filed on Nov. 22, 2021, 43 Pages, Related US Patent Application Serial No. 2021-189545.

Intellectual Property Office, Notification of Transmittal of the International Search Report and the Written Opinion of the International Searching Authority, or the Declaration, International application No. GB2116119.5, International Filing Date Nov. 10, 2021, dated Jul. 7, 2022, 9 pages.

* cited by examiner

IN-PACKET VERSION TAGGING UTILIZING A PERIMETER NAT

BACKGROUND

Embodiments of the present invention relate to sending data between networks, and more specifically, to maintaining flow affinity regardless of version or state changes in a network receiving data.

Maintaining flow affinity ensures that related data packets, or "data flows", will be forwarded to the same destination, e.g., communications between a client in a particular network and a back-end server in a different network. Maintaining data flow affinity across a network is a desired network attribute of a network forwarding function that supports multiple destinations and/or multiple paths (e.g., a load-balancing system). For example, data packets from the same Transmission Control Protocol (TCP) connection require affinity to avoid a loss of connection, data packets from the same source IP address require affinity to allow abbreviated transport layer security (TLS) handshakes, and data packets from the same client computing device require affinity to support application specific optimizations and session states.

SUMMARY

Embodiments of the present invention utilize the connection tracking capabilities of a connection tracking device for making affinity preserving decisions by a forwarding device. Relevant information such as the configuration version at the initiation of each connection may be passed by the connection tracking device to the forwarding device. The connection tracking device may be anywhere on the path between a source (e.g., the client) and the forwarding device. The connection tracking device can be on the perimeter of a source network or on the perimeter of the forwarding device's network. The connection tracking and forwarding devices may be devices that also perform Network Address Translation (NAT) or load balancing, but may be any other network device, where the connection tracking device does connection tracking and the forwarding device makes affinity-based decisions.

The communication between the connection tracking device and the forwarding device to pass the version information may be done in any way that does not affect the connection. One embodiment includes encoding a version identifier in the destination port of each packet, which is a method that advantageously does not change packet size, is a standard Network Address and Port Translation (NAPT) operation and can be easily reversed by the forwarding device so the operation is transparent to clients and back-end servers. In another embodiment, there may be an overlay tunnel between the connection tracking device and the forwarding device such as a Virtual Private Network (VPN). In this embodiment, the version information may be encoded into the overlay rather than each individual packet, where a tunnel may be created for a specific version and the version identifier may be attached to the tunnel label in the header.

Various embodiments are directed to a computer-implemented method. In one embodiment, the method may include receiving, at a connection tracking device, a packet from a node in a first network, determining a version identifier for the packet, encoding the version identifier into the packet, and transmitting the packet containing the encoded version identifier to a forwarding device. These operations may be performed by the connection tracking device. In an embodiment, the forwarding device selects a back-end device in a second network based on client connection affinity and transmits the packet to the selected back-end device. The version identifier may be encoded into a destination port field of the first packet. The connection tracking device may be a perimeter network address translation (NAT) device. The forwarding device may be a load balancing device. The connection tracking device may indicate its own timestamp and the load balancing device may track the timestamp to version correlation. This may not be fully synchronized, but this is acceptable if the timestamp updates much faster than the version. The load balancing device only needs a way to repeat the decision it made for the first packet of a connection for all other packets of that connection. The connection tracking device may assure that the same timestamp is used for all the packets of a single connection. The timestamp must update fast enough to allow new connections to be mapped differently when the load balancing device version changes. If it is fast enough, the number of packets mapped using the old version is small.

In one embodiment, the version identifier corresponds with a set of back-end devices that are currently operable in the second network. In various embodiments, a current version is based on time, and the determining of the version identifier may include determining a time period that a current version identifier has been used and updating the version identifier when the determined time period exceeds a time period specified for updating the version identifier.

In various embodiments, a current version is based on a quantity of packets, and the determining of the version identifier may include determining a quantity of packets received at the connection tracking device for which a particular version identifier has been used, and updating the version identifier when the determined quantity of packets exceeds a particular quantity of packets specified for updating the version identifier. As with the timestamp to version correlation above, the load balancing device only needs a way to repeat the decision it made for the first packet of a connection for all other packets of that connection. The connection tracking device may assure the same version is used for all the packets of a single connection. The version must update fast enough to allow new connections to be mapped differently when the load balancing device version changes. If it is fast enough, the number of packets mapped using the old version is small.

In various embodiments, the determining of the version identifier includes receiving, by the connection tracking device, a control message from another node, and updating the version identifier in response to the control message.

In various embodiments, the determining of the version identifier includes: receiving, by the connection tracking device, a return packet, wherein the return packet is transmitted to the connection tracking device in response to the transmission of the packet containing the encoded version identifier to the forwarding device, and the return packet is encoded with a version identifier. A current version is updated based on the version identifier encoded in the return packet.

In various embodiments, the version identifier corresponds with a hash function used by the load balancing device in the second network or a policy employed by the load balancing device.

In another embodiment, a computer-implemented method includes receiving a packet from a network device of a first network by a network device of a second network. The forwarding device and at least one back-end device may be included in the second network. The method may include extracting from the packet, by the forwarding device, a version identifier for the packet. In addition, the method may include extracting from the packet, by the forwarding device, a source address and a source port, and determining a hash value using a particular hash function based on the extracted source address and source port. Moreover, the method may include: using the hash value, by the forwarding device, to select a network address of a back-end device corresponding with the remainder generated by dividing the integer hash value by the number of back-end devices; encoding, by the forwarding device, the selected network address into the packet as a destination address; and transmitting, by the forwarding device, the packet containing the selected network address to a back-end device having the selected network address.

In some embodiments, the particular hash function used to determine the hash value is selected from two or more hash functions based on the version identifier for the packet.

In some embodiments, the particular set of back-end devices currently operable in the second network is selected from two or more sets of back-end devices based on the version identifier included in the packet.

Other embodiments are directed to a system, device, or computer program product for performing the methods disclosed herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
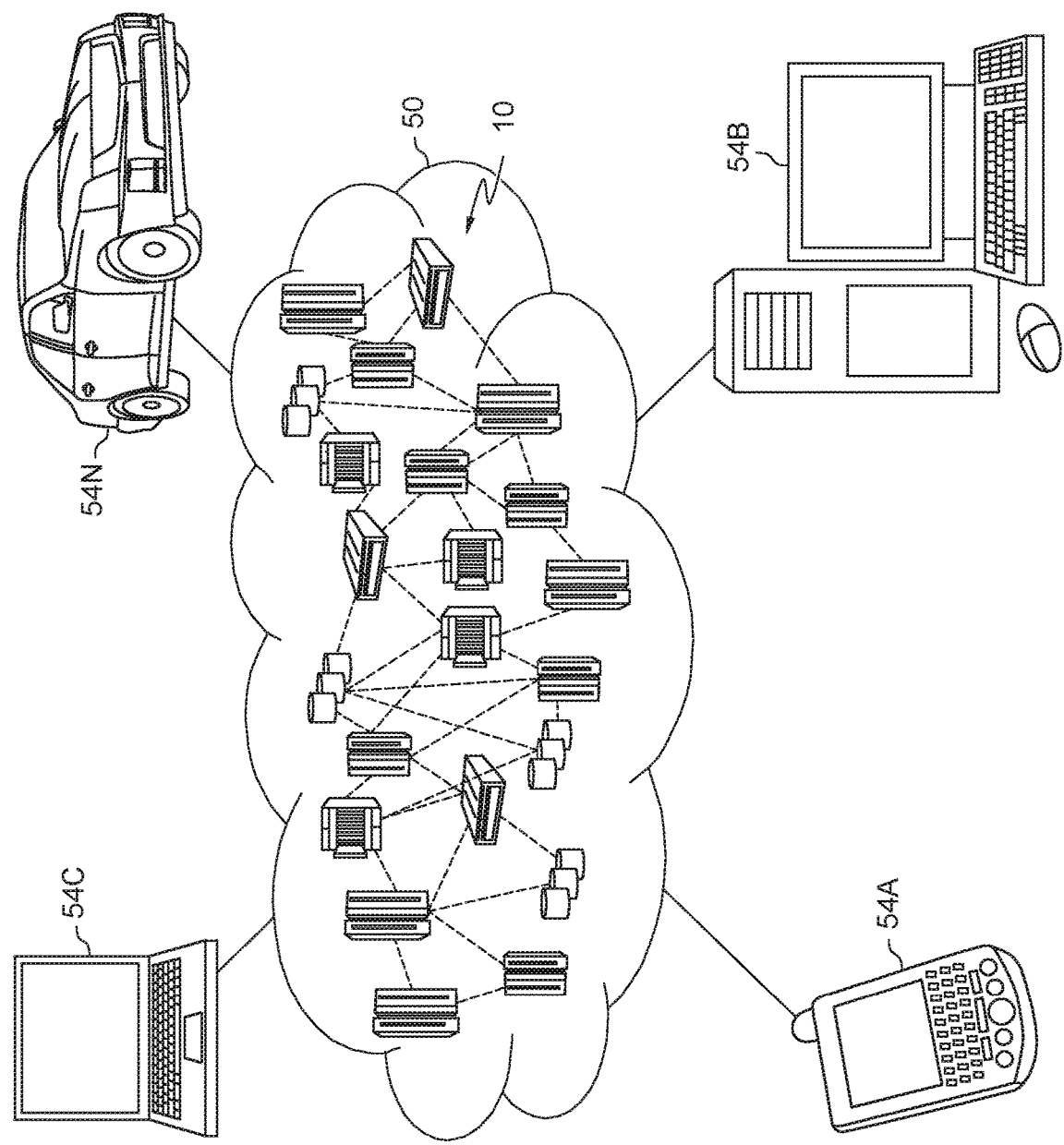
FIG. 1 depicts a cloud computing environment according to an embodiment of the present invention.

In distributed utility computing environments, such as clouds and other networks, it is advantageous to ensure that resources providing computing services can elastically grow and shrink according to the service load imposed by client computing devices. When client service load increases, a network is expected to adapt by allocating more resources and increasing the service capacity so that client computing devices do not experience network disturbances resulting from increased service load. When client service load decreases, the network is expected to adapt by timely releasing unneeded resources to reduce the overall operational costs and improve overall resource utilization by assigning resources elsewhere. Resource elasticity is typically implemented through a scalable pool of back-end network service nodes, for example, a back-end network server. Back-end network service nodes are added and removed to align allocated resource capacity with total client-imposed service load. An additional entity, a load balancer, can be added to the distributed computing environment to receive client requests and multiplex them among the back-end network service nodes in the pool.

Typically, the load balancer is configured to provide balanced distribution and forwarding of client requests for computing services over the network to back-end network service nodes. The load balancing algorithm, which determines the routing path for forwarding network client data packets, must consider several dynamic parameters, for example, back-end network service node pool size, utilization of resources, capacity of resources, and network client request characteristics. To ensure that the load balancer is not a single point of failure or a service bottleneck, the load balancer can also be implemented as an elastic service using a pool of load balancer nodes. The pool of load balancer nodes can also be dynamic, in that load balancers may be added to or removed from the pool in response to load balancer failures or changes in network load. In this case, data packets from the same data flow (i.e., from a same network client computing device) may be load-balanced by different load balancer nodes. In an elastic pool of load balancers, there is usually an attempt to maintain affinity between clients and load balancers.

When implementing network load balancing, it is important, and often required, that related data packets ("data flows") from the same network client computing device be routed to the same back-end network service node destination. The practice of routing data flows from a client computing device to the same back-end network service node destination is referred to herein as "client connection affinity." Maintaining affinity in large network and large cloud environments presents significant scalability issues and may lead to network bottleneck issues. These issues are further complicated in dynamic networks where network components may be added, modified, removed, or become unavailable. The load balancer forwarding decision must change, yet still maintain affinity. For example, when adding a new back-end network service node (e.g., a back-end network server), new data flows may be forwarded to the new back-end network service node. Existing data flows, however, must continue to be routed to their existing back-end network service node destination if possible. As another example, in a network environment where a pool of load balancer nodes is utilized, there may be multiple load balancer nodes that are dynamically added or removed and the resulting per-flow forwarding decision must be consistent across all the load balancer nodes.

Connection tracking may be used to maintain affinity in large scale dynamic networks by tracking active connections. Connection tracking remembers the forwarding decision for each data flow throughout its lifetime. For example, one can track each Transmission Control Protocol (TCP) 5-tuple throughout the TCP flow lifetime and log the forwarding decision entry as a forwarding rule in a forwarding table. The term 5-tuple refers to a set of five different values that are necessary to initiate a connection over Internet Protocol (IP), which are source IP address/port number, destination IP address/port number, and the network protocol in use. It should be noted that "IP address" refers to an address which may be used in the network layer by protocols such as Internet Protocol (IP) to identify specific clients and "port" refers to the port number which may be assigned to a given service in the transport layer, e.g., the telnet protocol uses port 23. It should also be noted that embodiments of the invention do not require a specific protocol; any protocol may be used, such as TCP or User Datagram Protocol (UDP).

Connection tracking may be implemented at a load balancer. With connection tracking, each new incoming IP packet is first checked to see if it is part of an existing data flow by referencing its 5-tuple and if it is found, the existing forwarding rule is applied. However, connection tracking in this way is not scalable, as both system memory requirements and forwarding decision entry lookup time increase with the number of data flows. Another drawback of connection tracking is that it requires synchronization of the connection tracking state between all load balancer nodes. It may be possible to capture a minimal state such as a "version" of the load balancer configuration but there still needs to be some mechanism to consistently map traffic flow to a specific version.

Another way to maintain affinity is hash-based routing. In this approach, a load balancer computes a hash of flow attributes based on the number of operable back-end servers. Use of hash-based routing preserves affinity so long as the number of back-end servers is static. When back-end servers are added or removed, affinity is lost.

Hash-based routing has been improved through the use of "consistent hashing", a distributed hashing scheme that operates independently from the number of back-end servers. In this approach, a load balancer computes a consistent hash of flow attributes and uses the hash result for routing decisions. Consistent hashing ensures that, for most flows, even when service instances are added or removed the hash will remain unchanged most of the time. Some drawbacks of consistent hashing are that it consumes prohibitive amounts of memory with its high computing requirements and that it is a solution for most flows but not all flows.

Other approaches for maintaining affinity are known, such as the use of cookies, but these approaches have various drawbacks. For one, the use of cookies requires the client to cooperate in preserving affinity by inserting cookies into messages, which in turn exposes the routing decision, and therefore the IP address of the back-end server, to the client. This could adversely affect network security. Another disadvantage is the performance overhead incurred by the load balancer because it is required to parse and manipulate protocol messages such that the cookie is inserted by the client in a manner appropriate for the protocol.

Accordingly, a need arises for a technique which provides fast and reliable transitioning between different versions of the multi-node service deployed in the utility computing system, including, in a broader sense of version, changes such as configuration changes, hardware or software upgrades of the nodes, and additions or removals of nodes (i.e., elastic changes to the service pool size), etc.

Advantages of the novel embodiments described herein include the use of a network device on the perimeter of a first network that includes multiple clients, such as a private network. Use of a network device on the perimeter of a first network alleviates the need for connection tracking at a load balancer in a second network, such as a network hosting multiple back-end servers. Other advantages are that processing and memory requirements at the load balancer in a second network are reduced. A further advantage is that the novel embodiments described herein are transparent to clients and back-end devices.

Embodiments of the present communications systems and methods may provide this capability by offloading the connection tracking function to another network device. Many networking environments have perimeter gateway devices such as routers or switches to isolate different attributes between separate network domains (such as private vs. public network addresses). One common function of the perimeter gateway device is Network Address Translation (NAT), which replaces, in each packet, internal IP addresses with external IP addresses (and vice versa). NAT requires connection tracking to make sure all packets for the same connection undergo the same address translation and to be able to translate back return packets, meaning that NAT inherently preserves flow affinity. Because these perimeter gateway devices typically perform NAT, they are also herein known as "perimeter NATs". In addition to IP address translation, perimeter NATs may also translate or modify port numbers. The perimeter NAT may maintain a "version" of the distributed, load balanced network and insert the current version into a field within a given packet, such as the destination port field. The load balancer may then be configured to record the current version whenever its state has changed. The load balancer may also look at the assigned field within the packet to determine the version that was in use when the connection was initiated (i.e., the version associated with the first packet in the data flow) and use this information with the other fields within the packet's 5-tuple to determine the back-end server to which the packet should be routed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
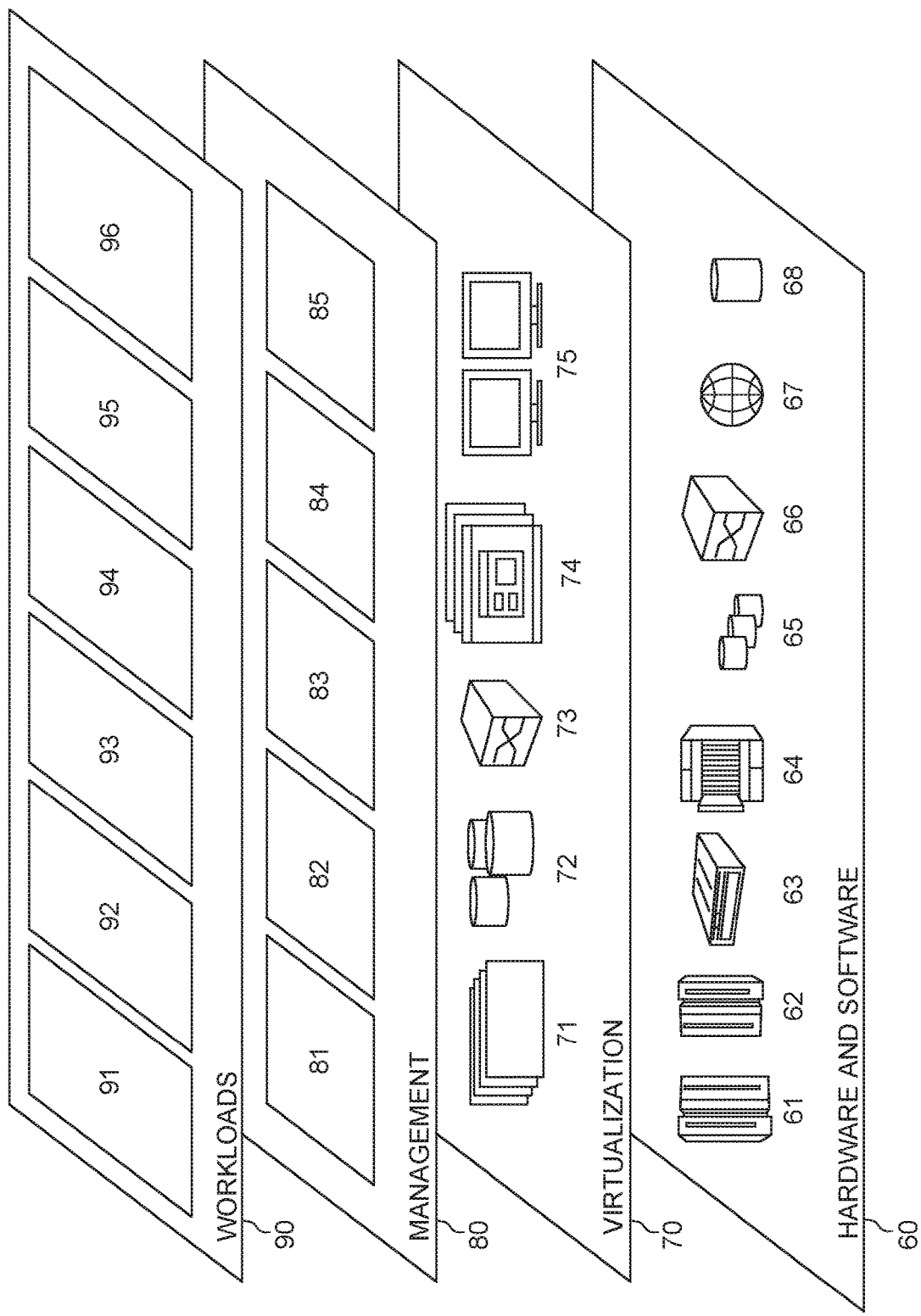
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and other applications 96 such as the programs residing in memory 308 in FIG. 3.

Figure 3:
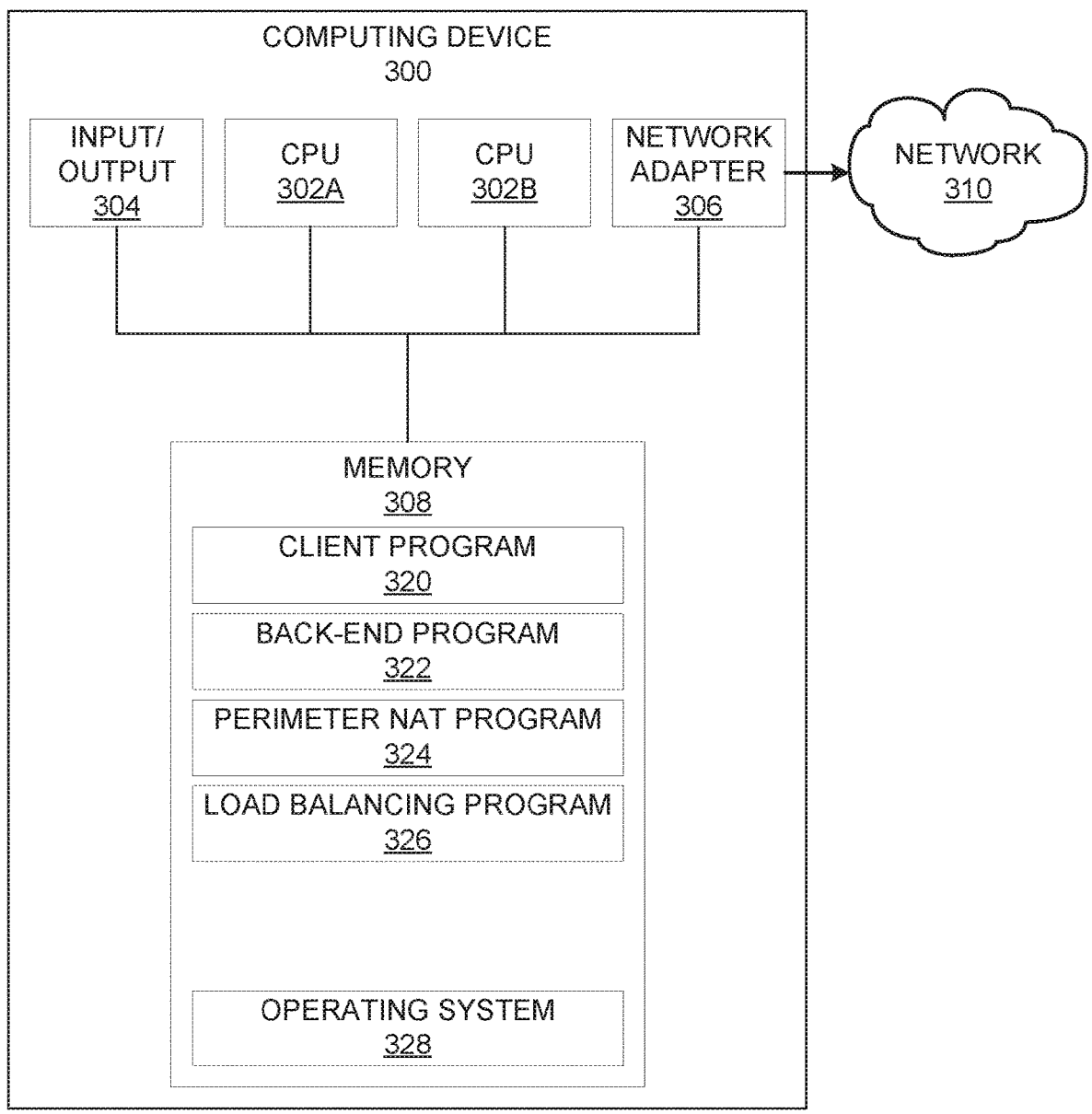
FIG. 3 is a block diagram depicting a computing device that can be employed as the network devices of FIG. 4, in accordance with an embodiment of the invention.

Referring to FIG. 3, a block diagram of a computing device 300, in which processes involved in the embodiments described herein may be implemented, is shown. Computing device 300 is typically a programmed general-purpose computer system, such as an embedded processor, system on a chip, personal computer, workstation, server system, and minicomputer or mainframe computer. Likewise, computing device 300 may be implemented in a communication device, such as a network switch, router, etc. Computing device 300 may include one or more processors (CPUs) 302A-B, input/output circuitry 304, network adapter 306 and memory 308. CPUs 302A-B execute program instructions in order to carry out the functions of the present communications systems and methods. FIG. 3 illustrates an embodiment in which computing device 300 is implemented as a single multi-processor computer system, in which multiple processors 302A-B share system resources, such as memory 308, input/output circuitry 304, and network adapter 306. However, the present communications systems and methods also include embodiments in which computing device 300 is implemented as a plurality of networked computer systems, which may be single-processor computer systems, multi-processor computer systems, or a mix thereof.

Input/output circuitry 304 provides the capability to input data to, or output data from, computing device 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces computing device 300 with a network 310, which may be any public or proprietary LAN or WAN, including, but not limited to the Internet.

Memory 308 stores program instructions that are executed by, and data that are used and processed by, CPU 302A-B to perform the functions of computing device 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an Integrated Drive Electronics (IDE) interface, or a variation or enhancement thereof, such as enhanced IDE (EIDE) or Ultra-Direct Memory Access (UDMA), or a Small Computer System Interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a Fibre Channel-Arbitrated Loop (FC-AL) interface.

The contents of memory 308 may vary depending upon the function that computing device 300 is programmed to perform. In the example shown in FIG. 3, example memory contents are shown representing routines and data for embodiments of the processes described herein. However, it may be recognized that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 3, for examples in which computing device 300 implements a perimeter NAT 430, memory 308 may include perimeter NAT program 324. For examples in which computing device 300 implements a load balancing node 450, memory 308 may include load balancing program 326. In further examples, if computing device 300 implements a client 410, memory 308 may include client program 320 or if computing device 300 implements a back-end node 470, memory 308 may include back-end program 322. These and other examples may include operating system 328. For example, perimeter NAT program 324 may include routines and data that provide the capability to manipulate packets by replacing destination IP addresses and ports or any other packet field. Load balancing program 322 may include routines and data that provide the capability to spread data traffic to other devices, such as back-end nodes 470. Operating system 328 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems are capable of running many tasks at the same time and are called multitasking operating systems. Multi-tasking is the ability of an operating system to execute more than one executable program at the same time. Each executable program is running in its own address space, meaning that the executable programs have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 4:
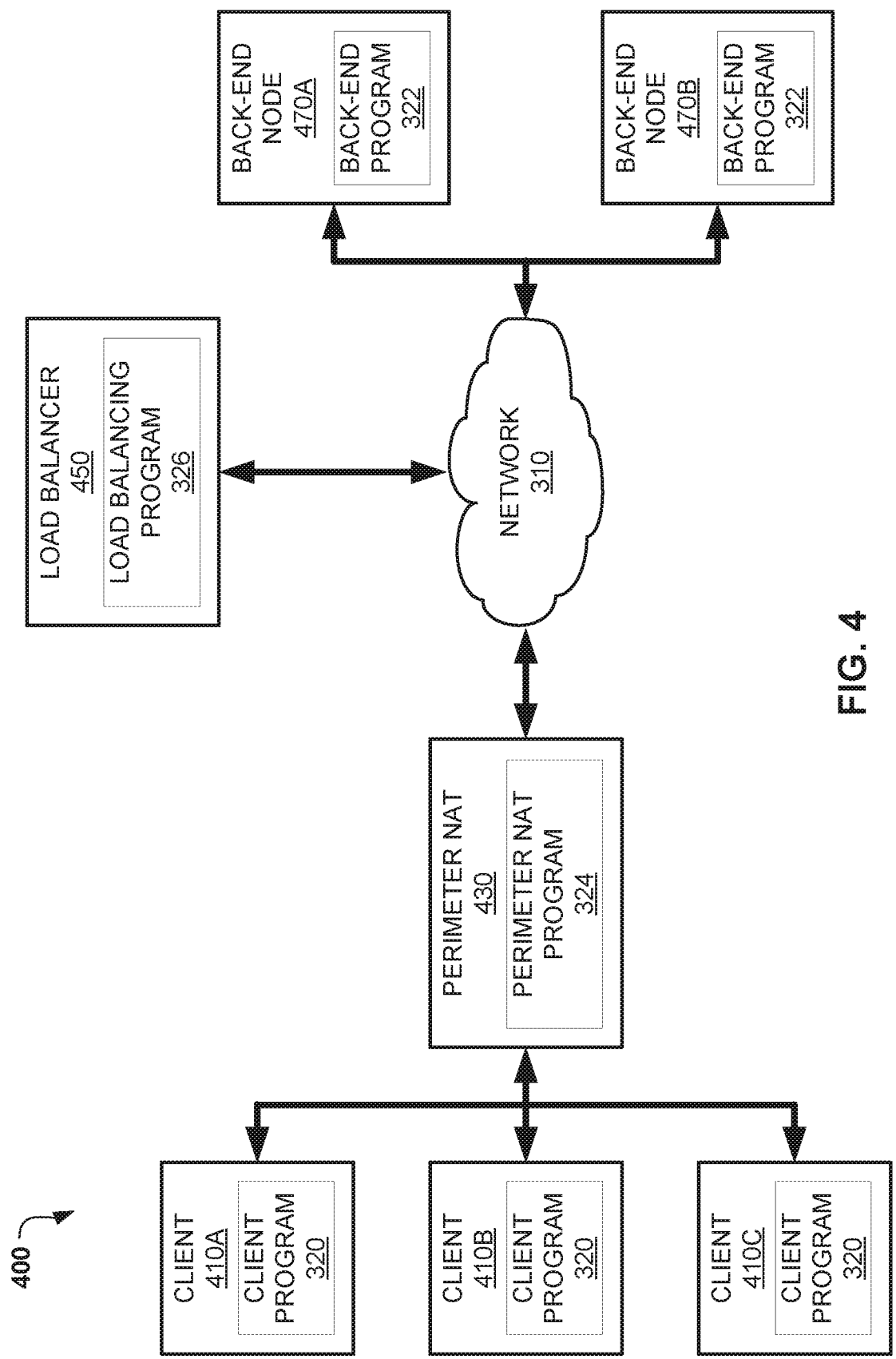
FIG. 4 is a functional block diagram illustrating an example computing environment, in accordance with an embodiment of the present invention.

Referring to FIG. 4, a functional block diagram illustrating a system 400 is shown, in accordance with an embodiment of the present invention. The system 400 may include multiple clients, e.g., clients 410A, 410B, 410C, multiple perimeter NATs, e.g., perimeter NAT 430, multiple load balancers, e.g., load balancer 450, and multiple back-ends, e.g., back-end nodes 470A, 470B, all interconnected via network 310. In the example shown in FIG. 4, clients 410 may belong to a particular network, and back-end nodes 470 may belong to a different network. For clarity, the two networks may also be referred to as "source" and "destination" networks. In addition, while two networks are shown in the example of FIG. 4, it should be appreciated that more than two networks can be involved in other embodiments. In particular, it should be understood that the perimeter NAT 430 and the load balancer 450 may, but do not have to, reside on either the source or destination network, i.e., the perimeter NAT 430 does not have to reside in the same network as the clients 410 and the load balancer 450 does not have to reside in the same network as the bank-end nodes 470. A connection tracking device, e.g., perimeter NAT 430 may be anywhere on the path between a source (client 410) and a back-end device. In various embodiments, the connection tracking device can be on the perimeter of the source network or on the perimeter of a network containing back-end devices.

In various embodiments, network 310 may represent, for example, an intranet, a local area network (LAN), a wide area network (WAN) such as the Internet, or a combination of the two. Network 310 may include, for example, wired, wireless or fiber optic connections. In general, network 310 may be any combination of connections and protocols that will support communications between clients 410A-C, perimeter NAT 430, load balancer 450, and back-end nodes 470A-B, in accordance with an embodiment of the invention.

Clients 410A-C may represent network computing devices capable of hosting client applications. For example, the clients 410A-C and perimeter NAT 430 may be included in a private network. Clients 410A-C may include client program 320. In an example embodiment, client 410 may be a desktop computer, a notebook, a laptop computer, a tablet computer, a handheld device, a smartphone, a thin client, or any other electronic device or computing system capable of sending and receiving data to and from other computing devices such as load balancer 450 or back-end 470, via network 110 through perimeter NAT 430. As depicted in the example illustration in FIG. 5, client 410 may be implemented using multiple devices, referred to as client 410A, client 410B, and client 410C, etc.

In various embodiments, client program 320 may be a program, or subroutine contained in a program, that may allow a user of client 410 to request and utilize services from a back-end network server node 470A-B, via perimeter NAT 430, network 310, and load balancer 450. Client program 320 may include components used to transmit data to an application residing on perimeter NAT 430. In an example embodiment, client program 320 may send a TCP data packet, as part of a data flow, to perimeter NAT 430. The data packet that client 410A-C transmits to perimeter NAT 430 includes a destination address, which may be an internal address.

Perimeter NAT 430 may represent a network component or device capable of hosting an address translation program. In addition, Perimeter NAT 430 may represent a network component or device capable of tracking a connection, and, as such, may be referred to herein as a "connection tracking" device. Perimeter NAT program 324 may perform Network Address Translation (NAT) and connection tracking functions. Perimeter NAT 430 allows data to flow from one network to another, e.g., from a network that includes multiple clients 410A-C to the network 110. Perimeter NAT 430 isolates attributes between domains, e.g., between an internal network, e.g., an internal network that includes clients 410A-C, and an external network. Perimeter NAT 430 tracks the connection for packets in a data flow between a particular network client a particular back-end network service node. Perimeter NAT 430 may receive data packets from clients 410A-C, load balancers 450, back-end nodes 470A-B, or other sources. Each packet the perimeter NAT 430 receives includes a destination address. Perimeter NAT 430 may replace the destination address with another address. For example, in a data packet sent to the perimeter NAT 430 by a client 410A-C, the perimeter NAT 430 may replace an internal address with an external address. In addition to modifying network addresses, perimeter NAT 430 may modify the port number. The packet sent to the perimeter NAT 430 by a client 410A-C may be one of several related data packets which form a data flow from client 410A-C.

Load balancer 450 may represent a network component or device capable of making packet routing decisions that preserve client connection affinity. Load balancer 450 may host a load balancing program 326. In an example embodiment, load balancer 450 may be a desktop computer, a networked computer appliance, a server blade, a specialized computer server, or any other electronic device or computing system capable of hosting a load balancing program 326. As depicted in the example illustration in FIG. 5, load balancer 450 may be implemented using multiple devices (distributed load balancing), referred to as load balancer 450A and load balancer 450B. The load balancer 450 is an example of a packet forwarding device.

In various embodiments, load balancer program 326 may be a program, or subroutine contained in a program, that may implement the functionality to provide balanced distribution and forwarding of network client requests over the network to back-end network service nodes. The load balancing program 326 may make packet forwarding decisions according to algorithms that have objectives of preserving client connection affinity and balancing workload. The load balancing program 326 may preserve client connection affinity to the extent it is feasible. In an example embodiment, load balancer program 326 may receive a data packet from client program 320, via network 310, and forward the received data packet to back-end program 322. The received data packet may be one of several related data packets which form a data flow from client 410A-C.

Back-end nodes 470A-B may represent a computing platform capable of hosting one or more resources for use by another computing device, such as client 410A-C. Back-end nodes 470A-B may include back-end program 322. In an example embodiment, back-end node 470A-B may be a desktop computer, a networked computer appliance, a server blade, a specialized computer server, or any other electronic device or computing system capable of sending and receiving data to and from other computing devices such as client 410A-C, perimeter NAT 430 and load balancer 450, via network 310. Back-end node 470A-B may include a cluster of servers executing the same software to collectively process and monitor the requests of other computing devices such as clients 410A-C. Back-end node 470A-B may be implemented using multiple devices, referred to as back-end node 470A, back-end node 470B, back-end node 470C, and back-end node 470D.

In various embodiments, back-end program 322 may be a program, or subroutine contained in a program, that may facilitate data requests received from client program 320, via load balancer program 326. In an example embodiment, back-end program 322 may receive a data packet from load balancer program 326. The received data packet may originate from client program 320 and represent part of a data flow from client 410A-C. Back-end program 326 may serve the received data packet.

Figure 5:
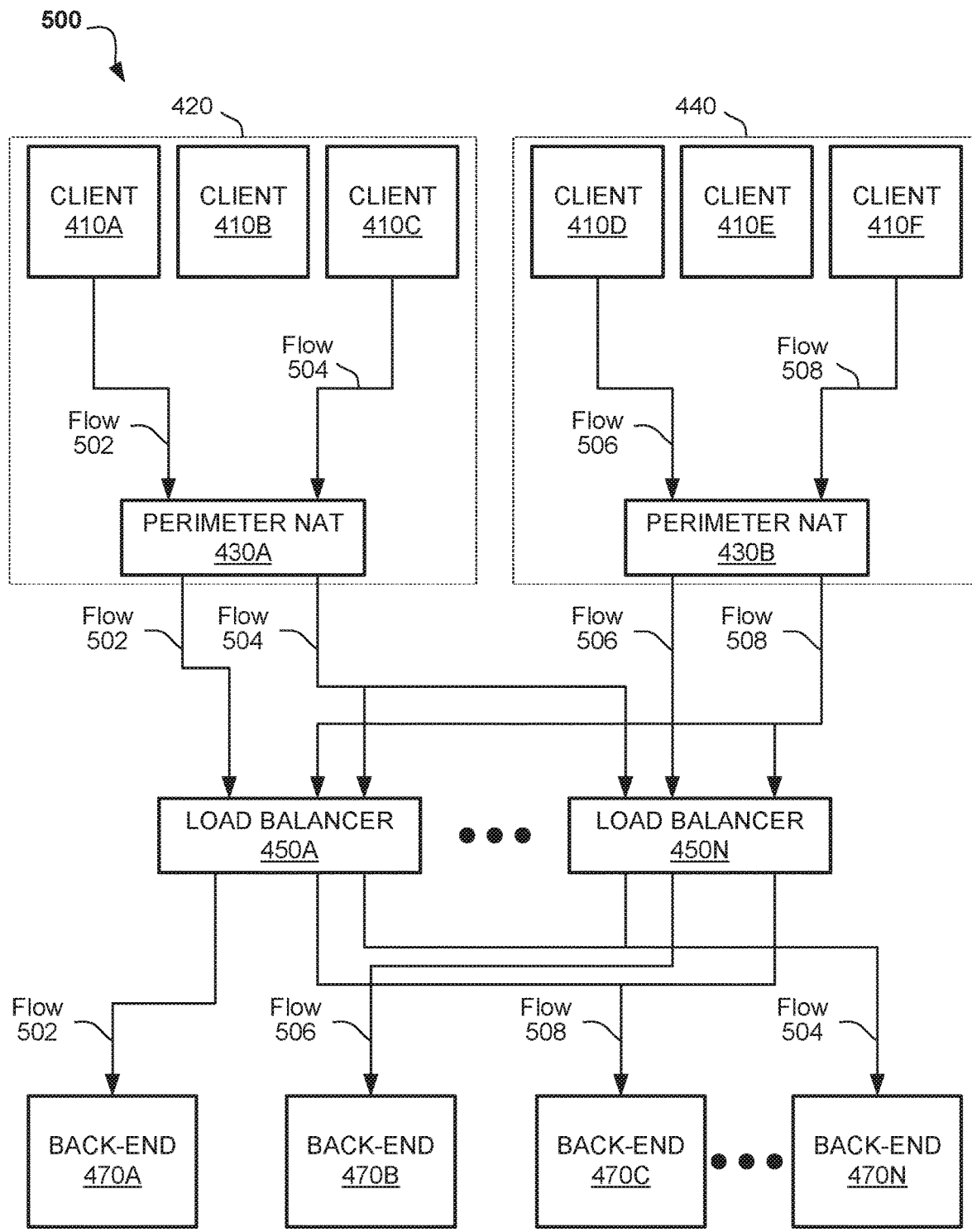
FIG. 5 is a functional block diagram illustrating data flows between networks, in accordance with an embodiment of the present invention.

Referring now to FIG. 5, a functional block diagram illustrating an example networking environment 500 is shown which may include a plurality of clients 410A-F as previously described with regard to FIG. 4, a plurality of perimeter NATs 430A-B as previously described with regard to FIG. 4, a plurality of load balancers 450A-N as previously described with regard to FIG. 4, and a plurality of back-end nodes 470A-N as previously described with regard to FIG. 4. Networking environment 500 is also shown with example data flows transmitted by clients 410A-F to perimeter NAT 430A for private network 420 which may include clients 410A-C and perimeter NAT 430A, or perimeter NAT 430B for private network 440 which may include clients 410D-F and perimeter NAT 430B. The data flows are forwarded by perimeter NATs 430A-B to load balancers 450A-N, which then forward the data flow to back-end nodes 470A-N, in accordance with various embodiments of the present invention. The data flow forwarding described herein can be implemented by the system 400 of FIG. 4.

Load balancing nodes 450A-N may each spread traffic to other devices, such as back-end nodes 470A-N, which may typically include back-end web servers, or other servers, storage, or computing devices. The number of load balancing nodes may change. In this example, initially there are 2 load balancing nodes 450A-B, but the number of load balancing nodes may change to N, resulting in load balancing nodes 450A-N. Likewise, the number of back-end nodes may change. In this example, initially there are 4 back-end nodes 470A-D, but the number of back-end nodes may change to N, resulting in back-end pool nodes 470A-N.

In an embodiment, load balancer 450A may forward data, sent from client 410A through perimeter NAT 430A (flow 502), to back-end node 470A. Furthermore, flow 504, transmitted by client 410C and forwarded by perimeter NAT 430A, may be forwarded by both load balancer 450A and load balancer 450B to back-end 470D. Additionally, in an embodiment, load balancer 450A may forward data, sent from client 410D through perimeter NAT 430B (flow 506), to back-end 470B. Also, flow 508, transmitted by client 410F and forwarded by perimeter NAT 430B, may be forwarded by both load balancer 450A and load balancer 450B to back-end 470C.

It is also to be noted that network switches, routers, and other devices, which are not shown in FIG. 5, may be present in networking environment 500. For example, there may be network switches present between load balancing nodes 450A-B and back-end nodes 470A-D in order to provide the desired network connectivity.

Figures 6A, 6B:
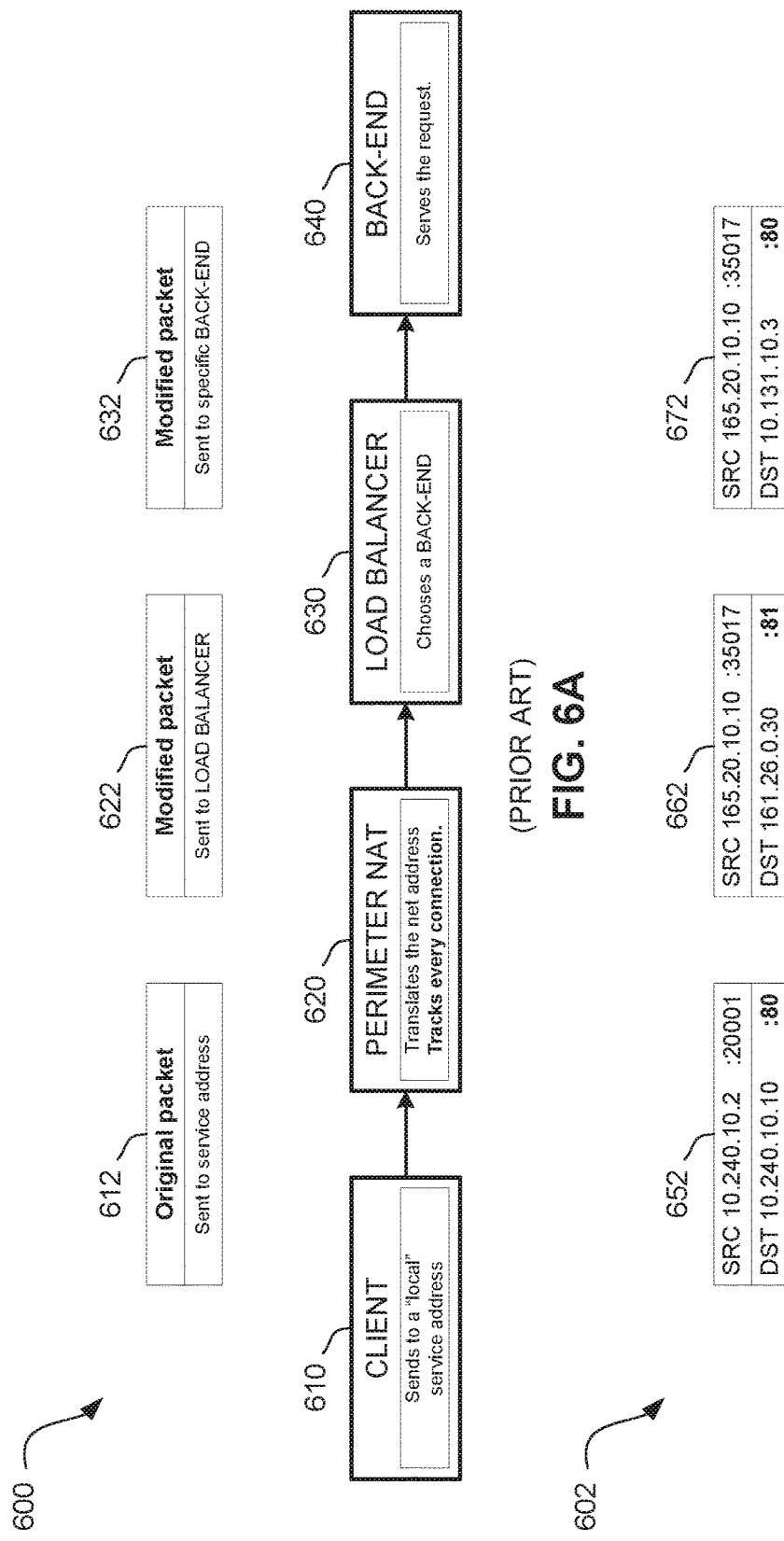
FIG. 6A is a block diagram of an example of packet flow between networks.
FIG. 6B is a block diagram of packet flow between networks according to various embodiments of the present invention.

Referring to FIG. 6A, a functional block diagram of a known TCP/IP networking process is shown from the view of a network packet. Client 610 may be on a private network in a home or a virtual private network (VPN) connection to an enterprise network and wishes to communicate with a web service that is resident on one or more back-ends 640 via the public Internet. The example shown in FIG. 6A corresponds with a virtual private endpoint (VPE) or similar service, which may create a VPN tunnel connection between a source and destination by adding the appropriate header(s) to the network packet. A network packet 612 that the client 610 sends to the perimeter NAT 620 includes the IP address of the client 610 as the source address, a chosen source port, the IP address of the private network interface of the perimeter NAT 620 as the destination address and the destination port that is assigned to the chosen Internet protocol, e.g., Hypertext Transfer Protocol (HTTP), which corresponds to port 80, as the destination port. In this example, the perimeter NAT 620 receives this packet 612 and performs a Network Address Translation (NAT) process to allow the data flow to continue over another network, however, it should be understood that the present invention does not require that a connection tracking device perform an NAT process. In this example, the NAT process transforms the packet 612 into modified packet 622 and, as discussed above, this requires the perimeter NAT to track the connection for every packet that it forwards. In other examples, the packet 612 is transformed into modified packet 622 in a process that is separate and distinct from any NAT process. This modified packet 622 has the IP address of the perimeter NAT 620 as its source IP address, a new chosen source port, the IP address of the load balancer 630 as the destination IP address and the same destination port as the packet 612. This packet 622 is forwarded to the load balancer 630, which determines the back-end 640 with the service that the packet 622 is trying to request. In this example, the load balancer 630 may modify the packet 622 by changing the destination IP address to the address of the back-end 640, resulting in packet 632. The load balancer 630 forwards packet 632 to the back-end 640. The back-end 640 receives the packet 632 and may respond directly to the client 610 via the perimeter NAT 620, now using its own address and port for the source information and the perimeter NAT information as the destination address and port.

Referring to FIG. 6B, a functional block diagram of an embodiment of the present invention is shown, also from the view of a network packet. The packets 652, 662, and 672 may include data (not shown) and header information that includes a source network address ("SRC") and a destination network address ("DST"). The packets 652, 662, and 672 may include a field for source and destination port numbers. The packets 652, 662, and 672 may include the same data, but different source and destination network address information, and different data in the source and destination port fields. For example, the packet 652 includes a destination network address of 10.240.10.10 and a port number of 80. The network addresses of client 410, perimeter NAT 430, load balancer 450, and backend 470 are shown in FIG. 6B. For example, the address of load balancer 450 is 161.26.0.30. It can be seen that the destination network address of packet 652 is the same as the network address of perimeter NAT 430. As previously described with regard to FIG. 4, client 410 may forward packet 652 to perimeter NAT 430.

In response to receiving packet 652, perimeter NAT 430 may, in some embodiments, perform NAT. In addition, according to various embodiments, the perimeter NAT 430 may change the destination port to a version identifier. In this example, version identifier 81 is encoded in packet 662. Version identifier 81 replaces destination port number 80 in packet 652. Perimeter NAT 430 forwards modified packet 662 to load balancer 450, which determines version from the packet 662. The load balancer 450 runs the appropriate hash function according to the version, as further described below. The load balancer 450 uses the extracted version identifier and hash function to select a destination backend 470, as further described below. The load balancer 450 restores the destination port to 80, which was the port number prior to the modification by perimeter NAT 430. The load balancer 450 forwards packet 672 to the selected back-end 470. The back-end 470 may receive packet 672 and respond directly to the client 410 via the perimeter NAT 430, now using its own address and port for the source information and the perimeter NAT information as the destination address and port.

Figure 7A:
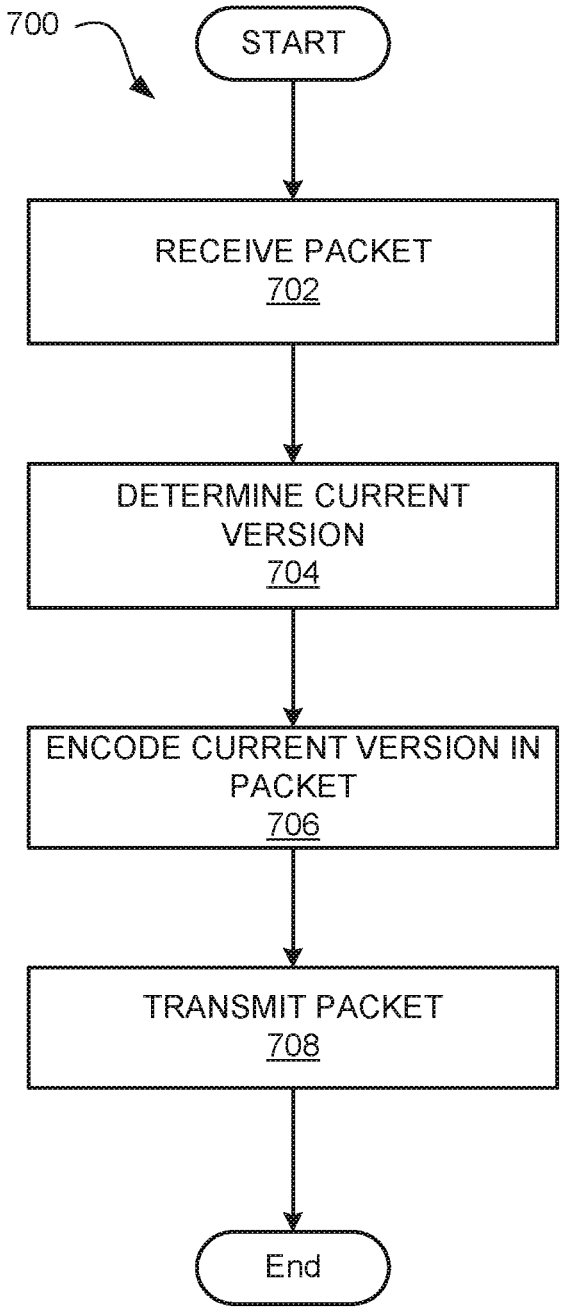
FIG. 7A is a flow diagram of a process for handling packets by a network gateway (known herein as a "perimeter NAT" or "connection tracking" device) according to various embodiments of the present invention.

Referring to FIG. 7A, a flow chart of a process 700 for tagging network packets with a version number is shown. The process 700 may be performed by a connection tracking network device, such as the perimeter NAT, a gateway, virtual private endpoint (VPE), a virtual private network (VPN) ingress server, a software defined network (SDN) egress device, or an SDN node-based NAT.

At 702, a data packet is received from a client computing device, e.g. client 410 by a connection tracking device. The packet may be received via a TCP connection. In an embodiment, the connection tracking device is configured to perform NAT. In an embodiment, the source address and port in the packet identify the device in the internal network they belong to, e.g., a private network. The device may use NAT to change the private source address and port to an address in the public address space, e.g., another network.

At 704, a version identifier for the packet may be determined. In an embodiment, the connection tracking device, e.g., the perimeter NAT 430, will maintain versions and corresponding version identifiers in memory. How the version identifier is determined at 704 depends on whether the received packet is a first packet or a subsequent packet in a sequence of packets for which connection affinity is being maintained. If the received packet is the first packet the sequence, the version identifier is established or set. If the received packet is a subsequent packet the sequence, the version identifier is determined by identifying the packet as belonging to an existing (tracked) connection and fetching the version identifier for the sequence from memory. According to various embodiments, version information may change. In some embodiments, a current version be updated based on a time or quantity condition. For example, the current version may be incremented after a particular number of packets have been received or transmitted by a network device, e.g., every 10,000 packets. As another example, the current version may be incremented after a time period has elapsed, e.g., every 5 seconds. In other embodiments, a current version be updated in response to receipt of a message indicating a change in the number of operable devices in a network. Networks are dynamic. For example, the number of gateways, load balancers, endpoints, or other network devices may change. In some embodiments, each particular network configuration may correspond with a version. In other embodiments, a policy change, rather than a back-end capacity change, may correspond with a version. Accordingly, a version identifier may be changed in response to receiving a message. The message may be a control message from a software-defined network (SDN). The message may be from a load balancer 450, such as an internet control message protocol (ICMP) message or another out-of-band message. In some embodiments, current state or version may be fetched via a DNS lookup for a service or using a fake SYN. In yet another example, the load balancer 450 could encode the current version as a source port in a return packet.

At 706, the version identifier may be encoded into the packet. The current version number may be inserted into the received network packet in any suitable field. In some embodiments, the version identifier is encoded into the destination port field. At this stage, the version identifier that is encoded into the packet is saved in a memory of the perimeter NAT to be used with subsequent packets within the sequence of packets, i.e., the same data flow.

At 708, the packet containing the encoded version identifier is transmitted to a forwarding network device, e.g., a load balancing device.

Figure 7B:
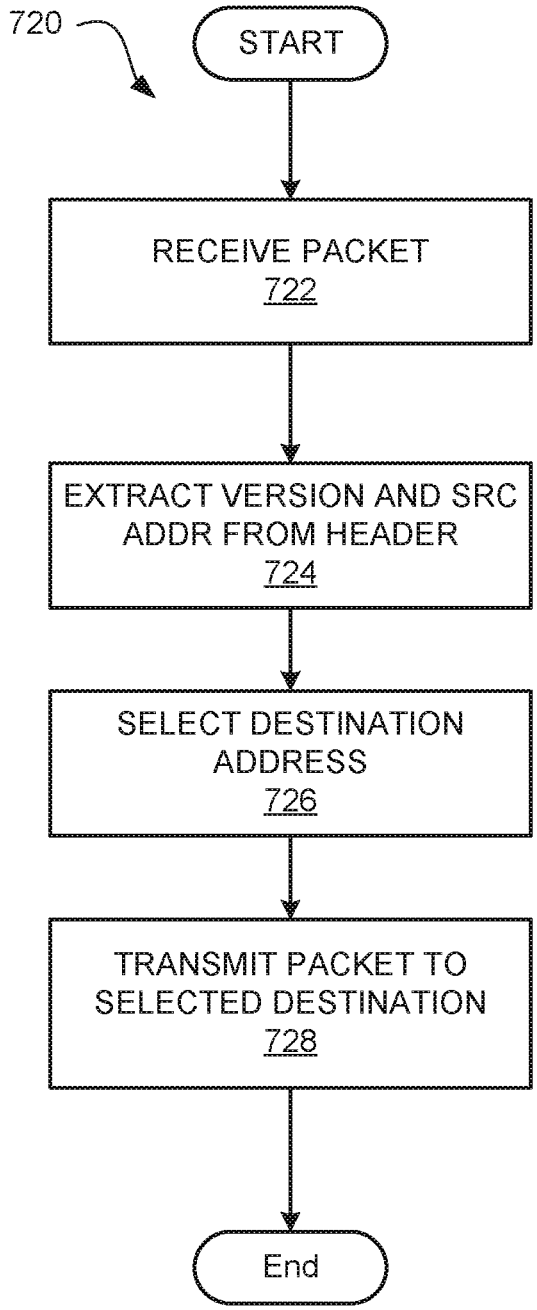
FIG. 7B is a flow diagram of process for handling packets by a load balancer (also referred to herein as a "forwarding" device) according to various embodiments of the present invention.

FIG. 7B is a flow diagram of process 720 for handling packets by a load balancer according to various embodiments of the present invention. The process 720 may be performed by any suitable network device with a forwarding capability, e.g., load balancer 450. At 722, a data packet is received by a forwarding device. For example, the packet may be received from the perimeter NAT 430. The packet may be received via a TCP connection. The receiving device and at least one back-end device may be included in the same network.

At 724, a version identifier may be extracted from received packet. The version identifier may be encoded in a destination port field in an embodiment. In other embodiments, the version identifier may be encoded in any other suitable part of the packet. In addition, the source IP address/port number, destination IP address/port number, and the network protocol in use may be extracted from the packet.

At 726, the destination (i.e., back-end server) to which the packet should be routed is selected. For instance, a particular hash function may be used to determine a hash value using the extracted source address and source port number as inputs to the hash function. At the same time, a table of back-end server addresses may be selected based upon the version identifier that was extracted from the packet. The table stores a list of available back-ends for a specific version. The hash value is divided by a particular number of back-end devices currently operable (determined by the number of rows in the selected table) in the back-end device network. A remainder produced by the division operation is determined and corresponds to the row number of the selected table that will be used. A network address of a back-end device in this table row is selected as the destination for the packet. A more specific example of this technique is discussed below in FIG. 8. As the load balancer 450 experiences state changes, it may note the version that is in the specified field for each of the flows that it is handling and update its forwarding rules accordingly.

At 728, the selected network address is encoded into the first packet as a destination address. In addition, a source port of an originating node may be encoded into the first packet as a source port to replace the version identifier with the source port of the node that originated in the packet. The first packet containing the selected network address is transmitted to a back-end device having the selected network address.

Figure 8:
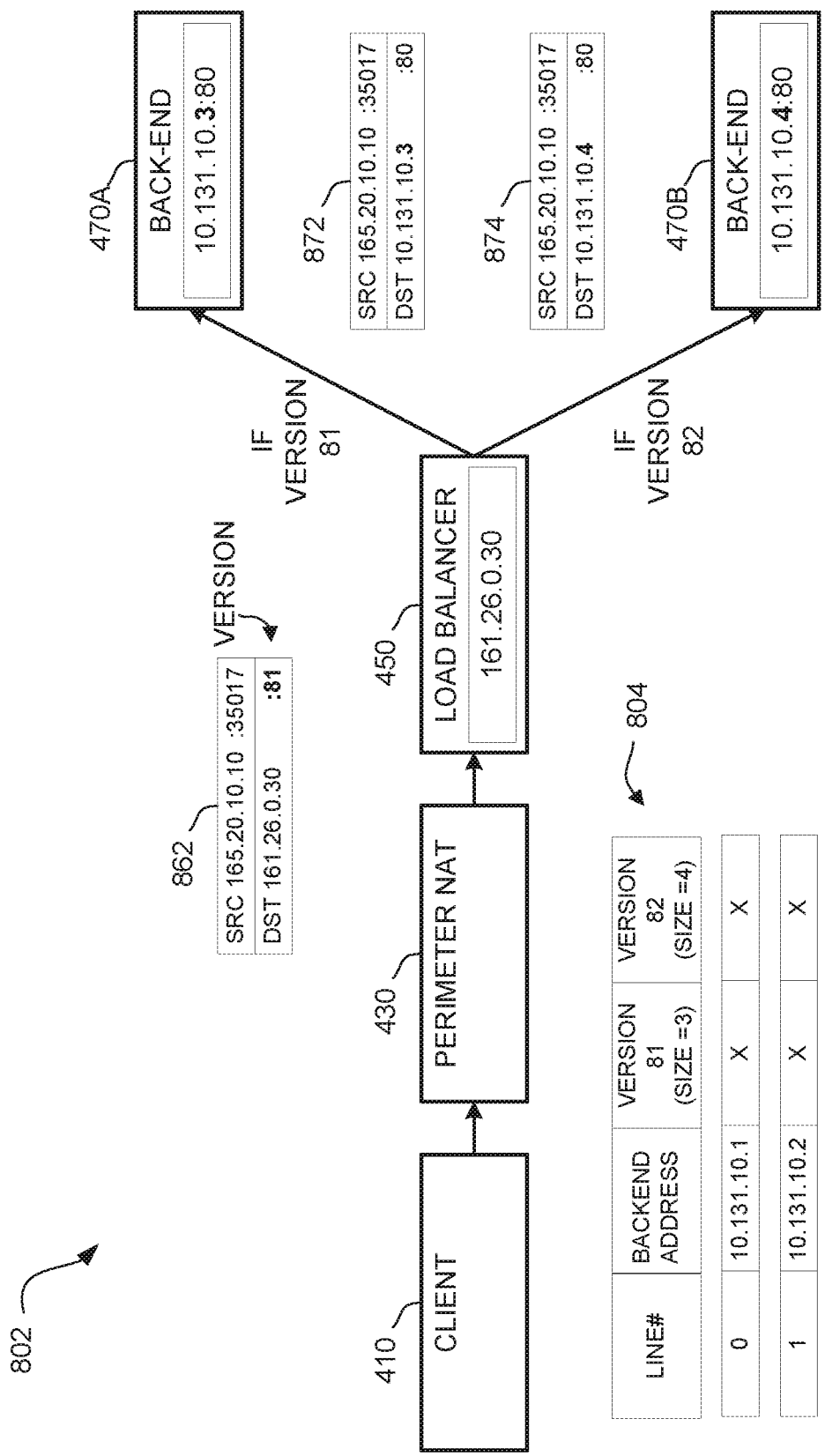
FIG. 8 is a block diagram of packet routing at a load balancer according to various embodiments of the present invention.

FIG. 8 is a block diagram of packet routing at a load balancer (or forwarding device) according to various embodiments. Load balancing device 450 receives packet 862 from NAT device 430. The client 410 and NAT device 430 may be part of a first network in one embodiment. The NAT device 430, load balancing device 450, and backends 470A and 470B may be part of a second network in another embodiment.

The load balancing device 450 extracts a version identifier for packet 862 from packet 862. In this example, load balancing device 450 extracts from the destination port field of packet 862 version identifier 81.

In addition, the load balancing device 450 extracts a source address and a source port from the packet 862. In this example, the load balancing device 450 extracts 165.20.10.10 as a source address and 35017 as a source port. The load balancing device 450 determines a hash value using a particular hash function, chosen based on the version identifier with the extracted source address and source port as inputs. The particular hash function may be any now-known or later developed hash function.

The hash function may be a hash function that produces a remainder or a hash function that does not produce a remainder. For both of these examples, FIG. 8 assumes the load balancing device 450 determining a hash value of 71. The load balancing device 450 determines a remainder after dividing the hash value of 71 by a particular number of operable back-end devices (determined from the version identifier as current at the time the connection was initiated). While only two back-end devices are shown in FIG. 8 (to simplify the drawing), it should be appreciated that any number of back-end devices may be operable even though not shown in the figure. In a first example in which a hash function is used that produces a remainder and the version identifier is 81, assume three (3) back-end devices are currently operable. Dividing 71 by 3 produces a remainder of 2 (71=23*3+2). The load balancing device 450 uses the remainder of 2 as an index to a row in table 804. In this example, the remainder of 2 points to row 2. Row 2 lists the address 10.131.10.3 for the back-end server.

The load balancing device 450 selects the network address of a back-end device from the table row corresponding with the remainder for the applicable version if the hash function used produces a remainder. If the hash function does not produce a remainder, a result produced by the hash function may be used to select a row from the table. Continuing the example where the hash function produced a hash value of 71, the load balancing device 450 selects the back-end device 470A with address 10.131.10.3 for version identifier 81 from row 2.

In a second example, shown in FIG. 8 with version identifier 82, assume four (4) back-end devices are currently operable. In addition, assume load balancing device 450 extracts version identifier 82 from packet 862. Dividing the hash value of 71 by 4 produces a remainder of 3 (71=17*4+3). The load balancing device 450 uses the remainder of 3 as an index to a row in table 804. In the second example, the remainder of 3 points to row 3. Row 3 lists address 10.131.10.4 for the back-end server. In the second example, the load balancing device 450 selects the back-end device 470B with address 10.131.10.4 for version identifier 82 from row 3.

The load balancing device 450 encodes the selected network address into the packet as a destination address and transmits the packet containing the selected network address to a back-end device having that address. Continuing the examples, if the selected address is 10.131.10.3, packet 872 is transmitted to back-end device 470A. If the selected address is 10.131.10.4, packet 874 is transmitted to back-end device 470B.

The load balancing device 450 may encode a source port number of an originating node (client 410) into the packet 872, 874 as a source port. The NAT device replaced the source port number of the originating node in the packet 862 with a version identifier. By encoding a source port number into the packet 872, 874 the packet is restored to a format expected by back-end devices 470A, 470B. Back-end devices 470A, 470B may use the source port number of the originating node in the packet 862 when servicing the packet, e.g., in generating a reply.

In some embodiments, the particular hash function used to determine the hash value is selected from two or more hash functions based on the version identifier for the first packet, and in some embodiments, consistent hashing may be used.

In some embodiments, the particular number of back-end devices currently operable in the second network is selected from two or more numbers of back-end devices based on the version identifier for the first packet.

When the load balancing function employs more than a single load balancing device 450, each of the load balancing device instances needs to know the set of back-end devices that correspond with each version. Accordingly, various embodiments provide for distributing the set of back-end devices that correspond with a particular version to each of the load balancing device instances.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:
receiving, at a connection tracking device, a packet from a node in a first network, wherein the packet is part of a data flow;
determining, by the connection tracking device, a version identifier, wherein the version identifier is generated by the connection tracking device based on a network configuration at a time that the data flow is initiated;
encoding, by the connection tracking device, the version identifier into the packet;
transmitting, by the connection tracking device, the packet containing an encoded version identifier to a forwarding device, wherein the forwarding device selects a back-end device based on the encoded version identifier; and
transmitting, by the forwarding device, the packet to the back-end device, wherein the back-end device is in a second network.

2. The computer-implemented method of claim 1, wherein the encoding, by the connection tracking device, the version identifier into the packet includes encoding the version identifier into a destination port field of the packet.

3. The computer-implemented method of claim 1, wherein the encoding, by the connection tracking device, the version identifier into the packet includes encoding the version identifier into a field within a packet header.

4. The computer-implemented method of claim 1, wherein the connection tracking device is a perimeter network address translation (NAT) device.

5. The computer-implemented method of claim 1, wherein the version identifier corresponds with a set of back-end devices in the second network.

6. The computer-implemented method of claim 1, wherein generating the version identifier further comprises:
determining, by the connection tracking device, a time period that a current version has been used; and
updating the version identifier when a determined time period exceeds a pre-configured time period for updating the version identifier.

7. The computer-implemented method of claim 1, wherein generating the version identifier further comprises:
determining, by the connection tracking device, a quantity of packets received at the connection tracking device for which a particular version identifier has been used; and
updating the version identifier when a determined quantity of packets exceeds a particular quantity of packets specified for updating the version identifier.

8. The computer-implemented method of claim 1, wherein generating the version identifier further comprises:
receiving, by the connection tracking device, a control message; and
updating the version identifier in response to the control message.

9. The computer-implemented method of claim 1, further comprising:

receiving, by the connection tracking device, a return packet, wherein the return packet is transmitted to the connection tracking device in response to the transmitting, by the connection tracking device, the packet containing the encoded version identifier to the forwarding device, and the return packet is encoded with the version identifier; and updating the version identifier in response to the return packet.

10. The computer-implemented method of claim 1, wherein the version identifier corresponds with a hash function used by the forwarding device or a policy employed by the forwarding device.

11. A computer-implemented method comprising:

receiving a packet from a connection tracking device in a first network by a forwarding device in a second network, wherein the second network includes at least one back-end device;

extracting from the packet, by the forwarding device, a version identifier for the packet;

extracting from the packet, by the forwarding device, a source address and a source port number, and determining a hash value using a particular hash function selected from two or more hash functions based on the version identifier for the packet based on the source address and the source port number;

using the hash value, by the forwarding device, to select a network address of a back-end device corresponding with a remainder;

encoding, by the forwarding device, the selected network address into the packet as a destination address; and transmitting, by the forwarding device, the packet containing the selected network address to the back-end device having the selected network address.

12. The computer-implemented method of claim 11, wherein a particular set of back-end devices currently operable in the second network is selected from two or more sets of back-end devices based on the version identifier for the packet.

13. A computing system comprising:

one or more processors;

a memory coupled to at least one of the processors; and a set of computer program instructions stored in the memory and operable to be executed by at least one of the processors to perform operations comprising:

receiving, at the computing system, a packet from a node in a first network, wherein the packet is part of a data flow;

determining, by the computing system, a version identifier, wherein the version identifier is generated by the computing system based on a network configuration at a time that the data flow is initiated;

encoding, by the computing system, the version identifier into the packet; and transmitting, by the computing system, the packet containing an encoded version identifier to a load balancing device in a second network.

14. The computing system of claim 13, wherein the encoding, by the computing system, the version identifier into the packet includes encoding the version identifier into a destination port field of the packet.

15. The computing system of claim 13, wherein the computing system is a perimeter network address translation (NAT) device.

16. The computing system of claim 13, wherein the version identifier corresponds with a set of back-end devices that are currently operable in the second network in the second network.

17. The computing system of claim 13, wherein generating the version identifier further comprises:

determining, by the computing system, a time period that a current version has been used; and updating the version identifier when a determined time period exceeds a pre-configured time period for updating the version identifier.

18. The computing system of claim 13, wherein generating the version identifier further comprises:

determining, by the computing system, a quantity of packets received at the computing system for which a current version identifier has been used; and updating the version identifier when a determined quantity of packets exceeds a particular quantity of packets set for updating the version identifier.

19. The computing system of claim 13, wherein generating the version identifier further comprises:

receiving, by the computing system, a control message from a node in the second network, wherein the second network includes at least one back-end device; and updating the version identifier in response to the control message.

* * * * *